United States Patent
Hoshino

Patent Number: 5,154,382
Date of Patent: Oct. 13, 1992

[54] ANGLE ADJUSTING MECHANISM

[75] Inventor: Yoshiki Hoshino, Aichi, Japan

[73] Assignee: Hoshino Gakki Co., Ltd., Japan

[21] Appl. No.: 751,729

[22] Filed: Aug. 29, 1991

[30] Foreign Application Priority Data

Mar. 26, 1991 [JP] Japan .................. 3-26691

[51] Int. Cl.⁵ .............................. F16M 11/00
[52] U.S. Cl. .................... 248/185; 403/92; 403/157; 248/291
[58] Field of Search ........... 248/185, 183, 184, 178, 248/291, 284; 403/91, 101, 92, 97, 79, 157

[56] References Cited

U.S. PATENT DOCUMENTS

| | | | |
|---|---|---|---|
| D. 179,540 | 1/1957 | Knechtsberger | 248/185 X |
| 982,597 | 1/1911 | Habig | 248/185 X |
| 2,585,592 | 2/1952 | Sears | 248/291 |
| 2,673,059 | 3/1954 | Lustig | 248/291 X |
| 2,745,688 | 5/1956 | Farrington et al. | |
| 3,338,545 | 8/1967 | Magi | |
| 3,505,515 | 4/1970 | Adra | |
| 3,521,225 | 7/1970 | Kursman et al. | 248/291 X |
| 4,034,946 | 7/1977 | Zimmer, Jr. | 248/183 |
| 4,786,202 | 11/1988 | Arnold et al. | 403/79 |
| 4,929,113 | 5/1990 | Sheu | 403/91 |

FOREIGN PATENT DOCUMENTS

| | | | |
|---|---|---|---|
| 494668 | 7/1950 | Belgium | 248/291 |
| 3208179 | 9/1983 | Fed. Rep. of Germany | 248/178 |
| 2347564 | 11/1977 | France | 403/91 |

Primary Examiner—Karen J. Chotkowski
Attorney, Agent, or Firm—Ostrolenk, Faber, Gerb & Soffen

[57] ABSTRACT

An angle adjusting mechanism between a first member placeable on a support post and a second member to which a support standard is attached for adjusting the angle of the standard with respect to the post. The first member having first and second spaced apart support walls. The second member having a third support wall disposed between the first and second walls. At least one friction plate at each side of the third wall and between the first and second walls. A holding metal fitting at the side of one friction plate and engageable with the inside of the second support wall, the holding metal fitting being moveable toward and away from the second wall and being prevented from moving across the second wall. A bolt and nut connection pulling the first and second support walls toward each other. The holding metal fitting uniformly distributing the compressive force around the friction plate. Rotation of the friction plate and/or of the holding metal fitting is prevented as the angle between the first and second members is adjusted, either by a splined connection between the holding fitting and the opening for the tubular part of the holding fitting in the second wall or through projections from the friction disks being received in slots in the first and second members.

17 Claims, 9 Drawing Sheets

ANGLE ADJUSTING MECHANISM

BACKGROUND OF THE INVENTION

The invention relates to an angle adjusting mechanism that holds two members at a desired relative angular position.

A boom type microphone stand, which is shown in FIG. 6 hereof, provides one application or use for the invention. As shown in FIG. 6, the microphone stand comprises a main stand S, an arm A on which a microphone is installed, and a boom 80 which connects the stand S and the arm A to be freely adjustable in terms of their relative rotation angle.

As is shown in FIGS. 7 and 8, a conventional angle adjusting mechanism for the boom 80 comprises a fixed member 81 that is installed on the main stand S and a movable member 82 that is installed on the arm A. Two friction plates 83 on opposite sides of the member 82 are compressively tightened by tightening the fixed member 81 and spaced apart parallel, upstanding support walls 86 by means of a cooperating tightening bolt 84 and a nut 85, thereby fixing the tilt angle of the movable member 82. A metal washer 87 is disposed beneath the nut 85.

However, this conventional mechanism suffers bending from the upper side 88 of the support walls 86, at the end of the fixed member 81 when the tightening bolt 84 and the nut 85 are tightened. When the friction plates 83 are made of a substance like rubber, etc. having compressibility, what is then the upper side of the friction plate 83A is more strongly compressed than the lower side of that plate, as shown in FIG. 9. The uneven compression of the friction plate 83A causes a one-sided tightening of the movable member 82 and causes asymmetrical wearing of the friction plate 83A, which speeds up the aging process of the rubber material of the plate.

A friction plate made of a non-compressible material, like a plastic, is shown in FIG. 10, which also illustrates a conventional design. When a tightening force is applied to the top part 89 of both friction plates 83B, the tightening force is applied partially and insufficiently against the movable part 82. Much wearing of the top part 89 occurs, because of the eccentric load that is applied to the friction plates 83B. As the wearing of the top part 89 becomes greater, a greater tightening force on the nut 85 will be required to obtain the same amount of tightening force on the friction plates 83B. This decreases the durability of the friction plates and of the tightening nut. At the same time, cracks and ruptures may develop in the fixed member.

When the arm A is long or its weight is great, further, a larger tightening force is required to prevent the arm A from sagging down. This requires that the angle adjusting mechanism itself be made larger in size, which creates problems not only in terms of its over large outside appearance but also in terms of its functional ability.

SUMMARY OF THE INVENTION

It is an object of the invention to provide an angle adjusting mechanism which has a superior holding force, a compact outside appearance, which is smoothly operable and has high durability.

An angle adjusting mechanism of the invention includes a first member having a first support wall into which a tightening bolt is inserted and a second support wall for receiving a nut which is screwed onto the tightening bolt. A second member of the angle adjusting mechanism has a third holding wall which is disposed between the first and second support walls of the first member. A friction plate is provided on both sides of the third holding wall of the second member. A holding fitting, preferably made of non-yielding material, like metal, is provided inside the second support wall of the first member. That holding fitting includes a compressive part that compressively tightens the friction plate, which the holding fitting engages, due to the tightening of a support wall tightening means, in the form of a bolt and nut. The tightening means draws the support walls together and compresses the other elements between them.

Other objects and features of the invention are explained below with reference to the accompanying drawings.

DESCRIPTION OF THE PREFERRED EMBODIMENTS

Figure 1:
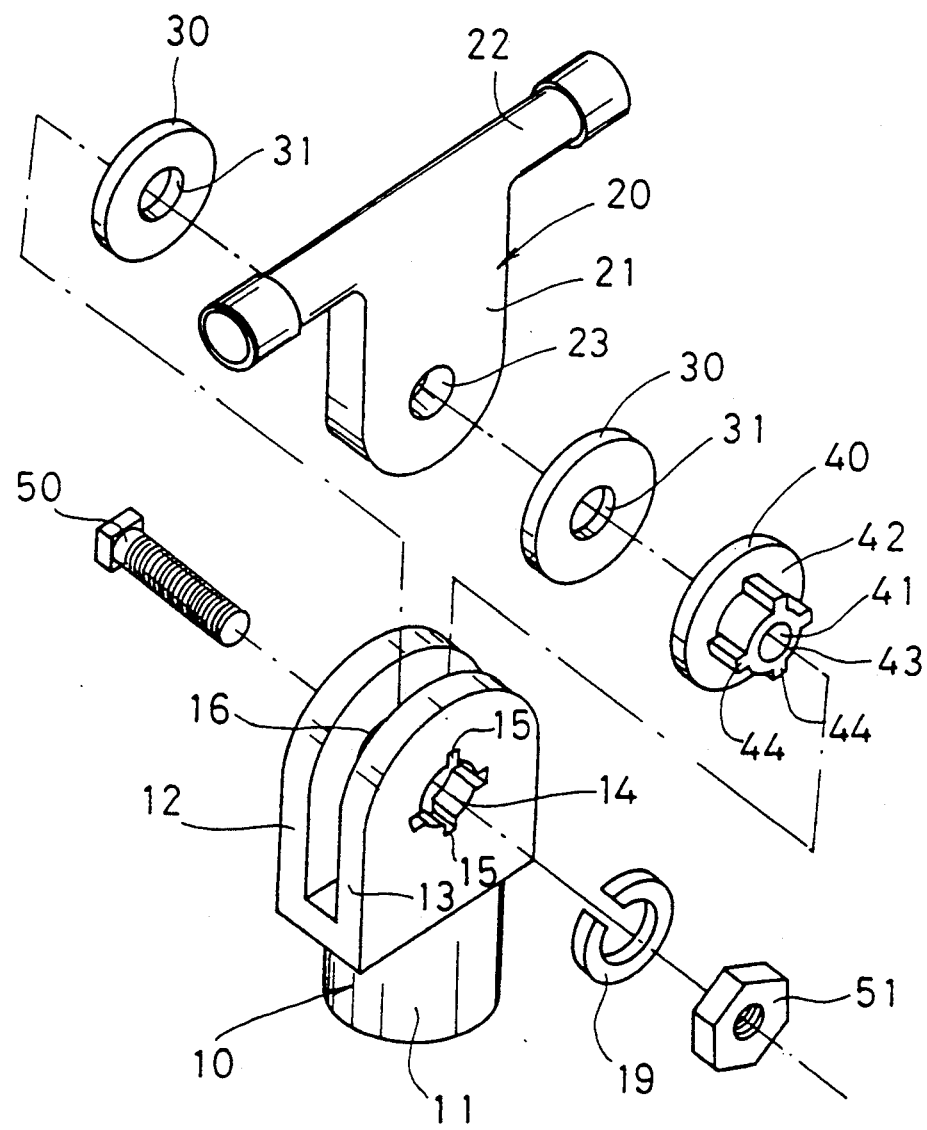
FIG. 1 is a disassembled, exploded, perspective view of the angle adjusting mechanism according to the invention.
Figure 2:
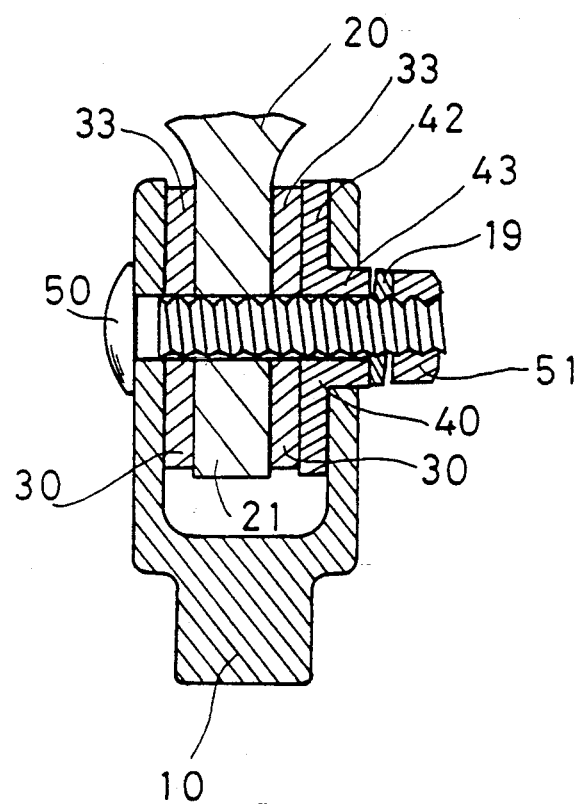
FIG. 2 is a cross section showing the assembled condition of the angle adjusting mechanism shown in FIG. 1.

As is shown in FIGS. 1 and 2, the angle adjusting mechanism in this example comprises a first member 10 that ordinarily serves as the fixed side of the mechanism, a second member 20 that serves as the movable side of the mechanism, at least one, and preferably a pair, of friction plates 30 at opposite sides of the member 20 and a holding fitting 40, preferably stiff and of metal.

The first member 10 includes a main tubular body 11 that becomes the installation part for the stand. A first support wall 12 is formed integrally with and stands up from the tubular main body 11. A second support wall 13 extends parallel to and is spaced a distance away from the first wall 12 and stands up from the main body 11. In the first support wall 12, there is a hole 16 for receiving and passing through an inserted tightening bolt 50. In the second support wall, there is a bearing hole 14 for the insertion and passage through of the tightening bolt 50. A nut 51 is to be screwed onto the tightening bolt 50.

The second member 20 includes a third holding wall 21 that is provided between the first support wall 12 and the second support wall 13. A tubular part 22 extends along the plane of the holding wall 21 and above that wall. The tubular part 22 serves as an installation part for the boom pipe of a microphone or as the support for any other object supported by the stand.

The third holding wall 21 has a bolt hole 23 through it in alignment with the bolt hole 16 and through which the tightening bolt 50 is inserted.

There is a friction plate 30 on one side of the holding wall 21 toward the support wall 13 or there are friction plates on both sides of the holding wall 21. Each friction plate 30 has a ring shape. The tightening bolt 50 is inserted through the hole 31 through the plate 30. A friction plate 30 is provided on both opposite sides of the third holding wall 21 of the second member 20.

The holding metal fitting 40 is also annular. It has a central insertion hole 41 for passage of the tightening bolt 50 through it. The fitting 40 comprises a tubular part 43 that engages with the bearing hole 14 of the second support wall 13. It also has a flange shaped compressive part 42 which is provided on the tubular part 43. The fitting 40 is provided at the inside of the second support wall 13 and contacts the friction plate 30 that is at that side of the third holding wall 21.

In this example, there are a plurality of convex splines 44, each of which engages a correspondingly shaped and circumferentially located cutout 15 that is formed on the border of the bearing hole 14 of the second support wall 13. The splines in the cutouts connection holds the fitting 40 so that it is capable of sliding only in the axial direction of the tightening bolt 50, as in a splined structure.

The tightening bolt 50 is inserted from outside the first support wall 12 of the first member 0 and the nut 51 is screwed onto the threaded shank of the bolt 50 from outside the second support wall 13, and the nut is tightened for drawing the first and second support walls 12 and 13 toward each other and integrally tightening together the various members.

Since the holding metal fitting 40 is able to slide in the axial direction of the tightening bolt 50 at this time, the friction plate 30 that contacts the fitting 40 is compressively tightened over the entire annular surface of the compressive part 42 of the holding metal fitting 40. At the same time, it presses its plate surface vertically. This applies a uniform surface pressure on the friction plate 30, which, in turn, applies a large friction force on the third holding wall 21 and on the contact surface 33. This produces a force that tightens to the holding wall 21 of the second member 20 evenly and strongly.

The frictional force that is applied to the contact surface 33 can be adjusted by selecting the size of the friction plate 30. This makes it possible to set the holding force which is necessary for positioning the second member 20.

In addition, it is possible to set the necessary tightening torque by inserting a spring metal washer 19 between the holding metal fitting 40 and the nut 51. This friction engaging washer enables adjustment of the angle by moving the movable side of the boom part, etc. without loosening the nut 51.

Figure 3:
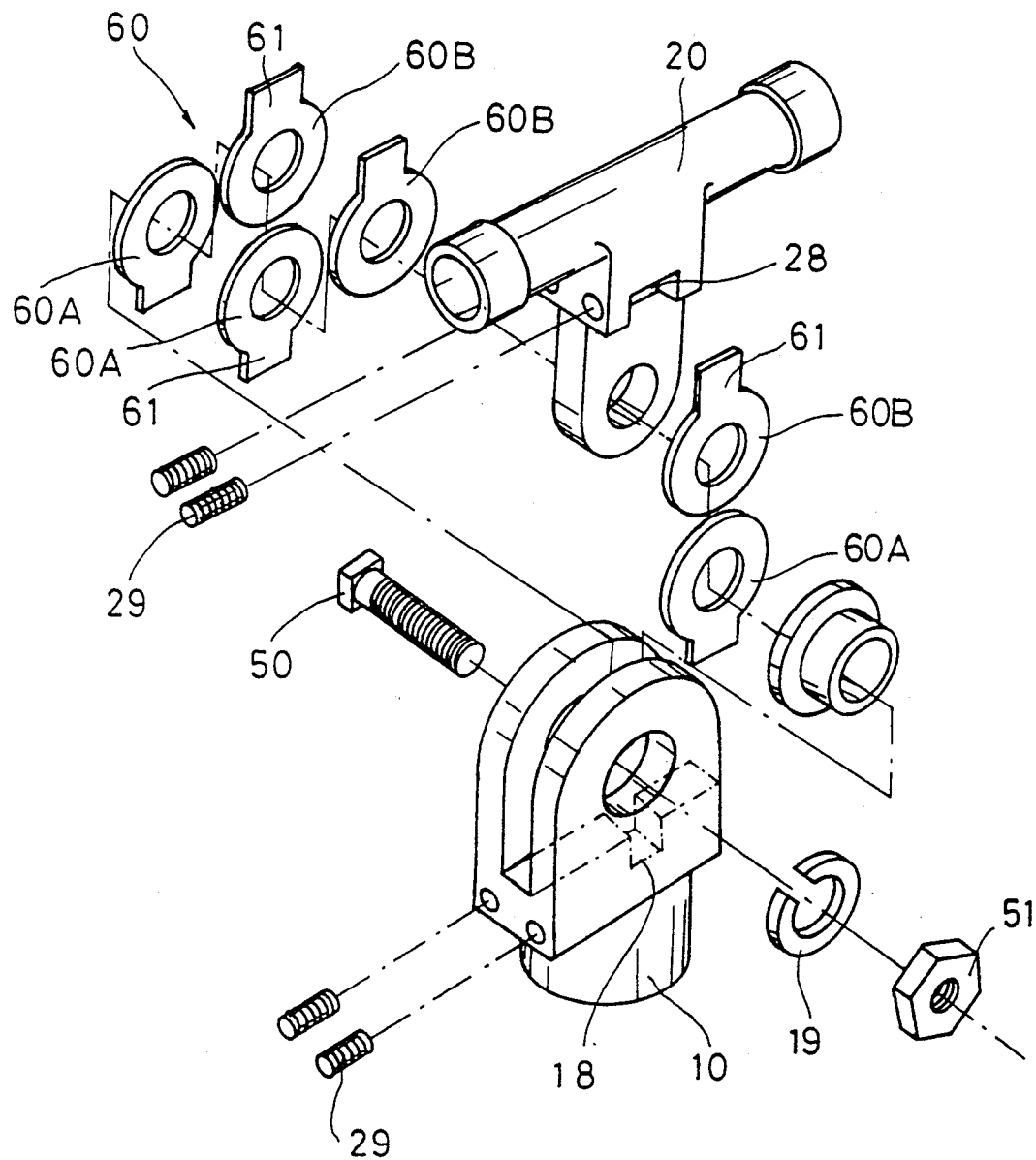
FIG. 3 is a disassembled, exploded, perspective view of another embodiment of the angle adjusting mechanism of the invention.
Figure 4:
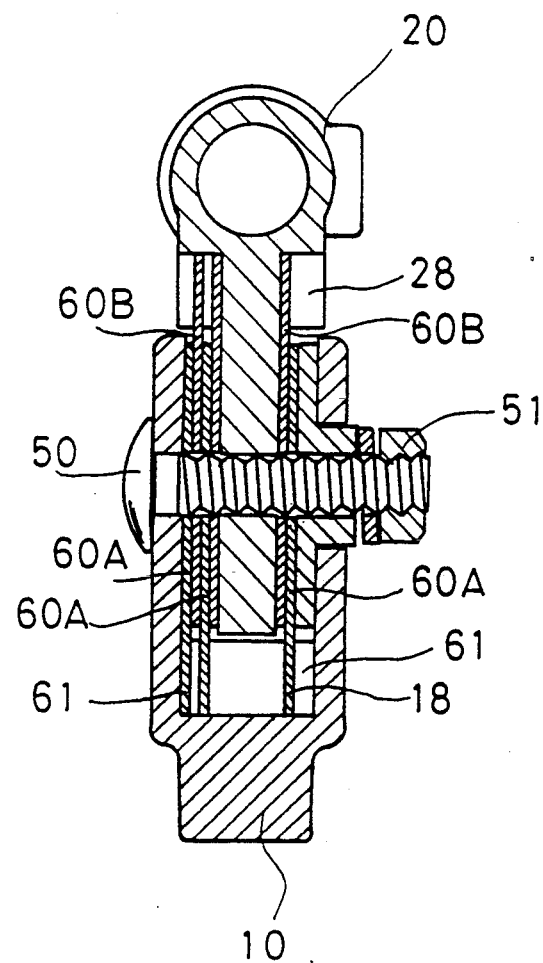
FIG. 4 is a cross section showing the assembled condition of the angle adjusting mechanism.

In FIGS. 3 and 4, the same reference numbers as in FIG. 1 indicate the same parts. FIGS. 3 and 4 show an embodiment employing a plurality of clawed friction plates 60. A claw part 61 projects from the periphery of each friction plate. A plurality of first friction plates 60A include claws that extend down to engage the stopping part 18 of the first member 10. A plurality of second friction plates 60B include claws that extend up to engage the stopping part 28 of the second member 20. The friction plates 60A and 60B are arranged alternately along the bolt 50. It is possible and desirable for the first friction plates 60A and the second friction plates 60B to be of the same construction, and to be inverted when installed.

The first member 10 and the various other members are integrally tightened together from both sides by means of the tightening bolt 50 and the nut 51.

In this embodiment, a friction force is produced on the facing contact surfaces of the various friction plates. As a consequence, the holding force against the second member 20 is further strengthened and its relative position is held accurately.

Figure 5:
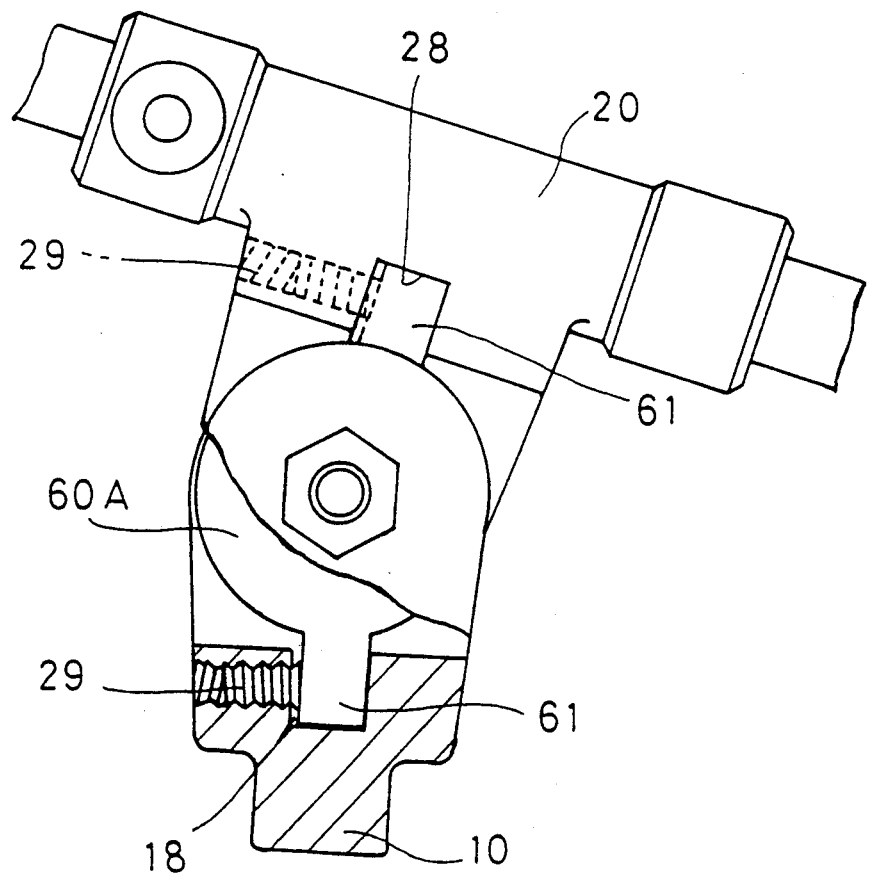
FIG. 5 is a partly cut away, front view of the mechanism in FIG. 4.
Figure 6:
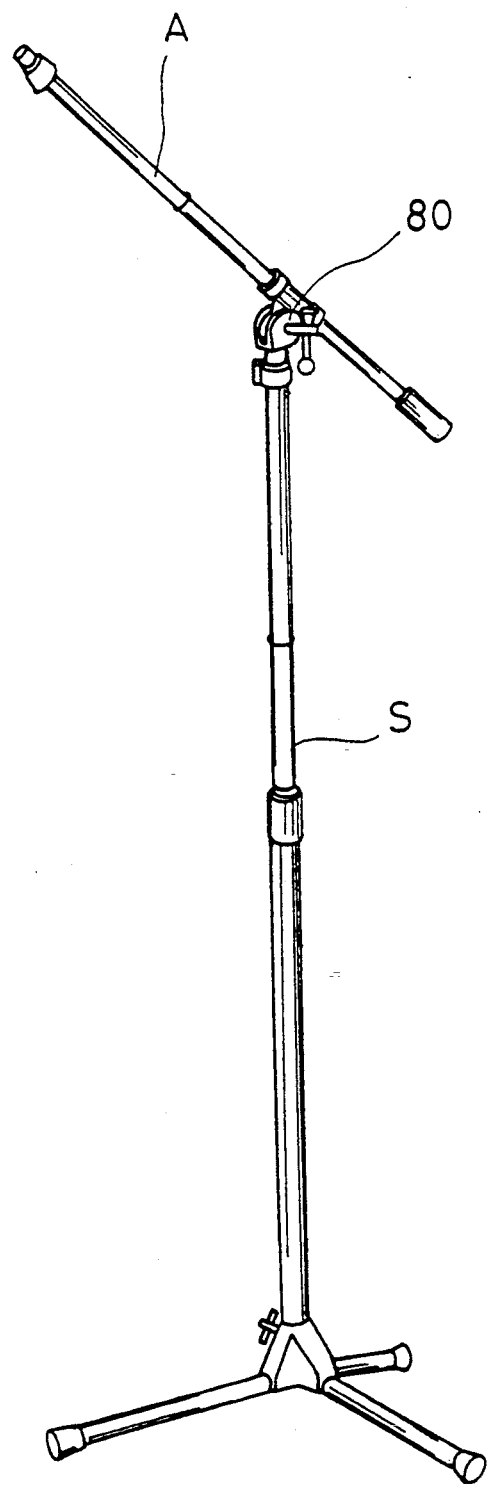
FIG. 6 is a perspective view of a prior art microphone stand.
Figure 7:
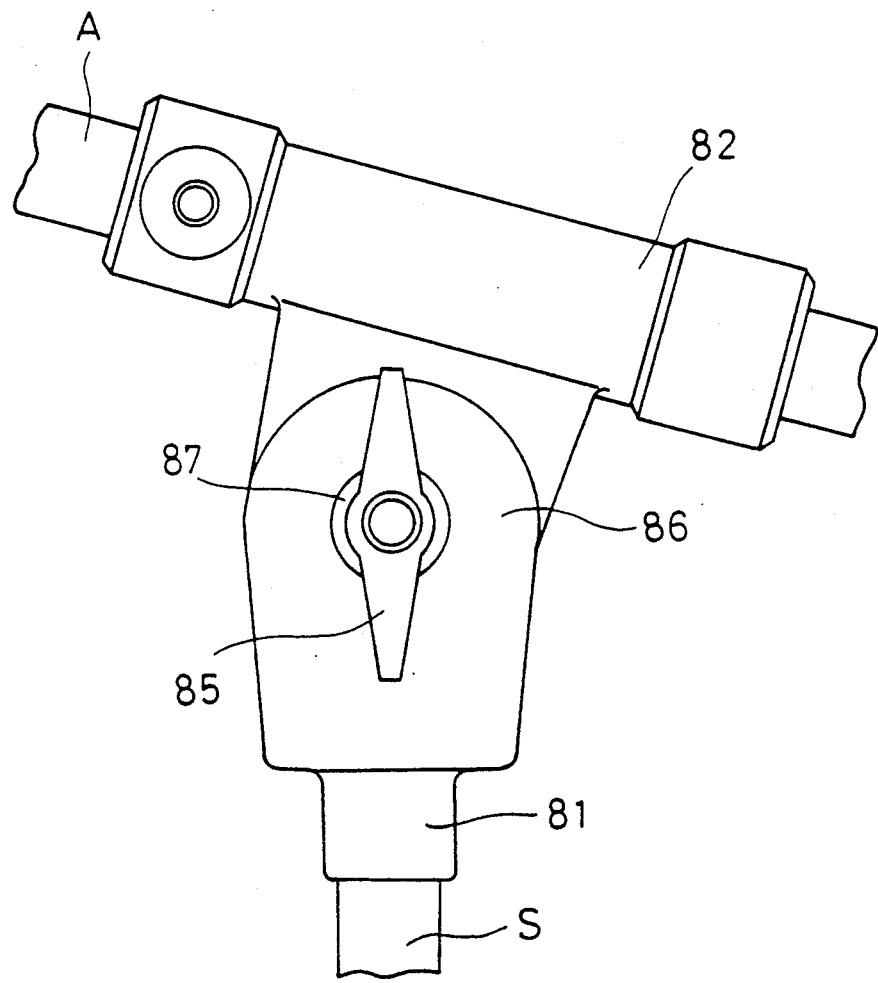
FIG. 7 is a front view of its essential parts.
Figure 8:
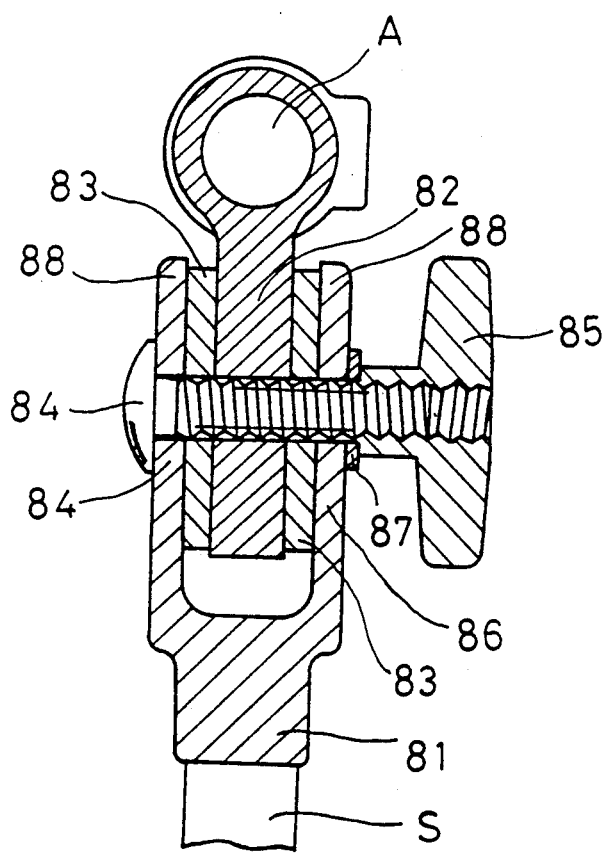
FIG. 8 is a cross section thereof.
Figure 9:
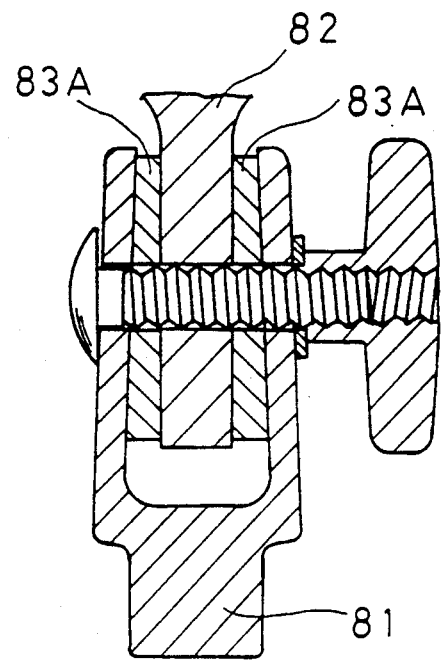
FIG. 9 shows the cross section in the tightened state.
Figure 10:
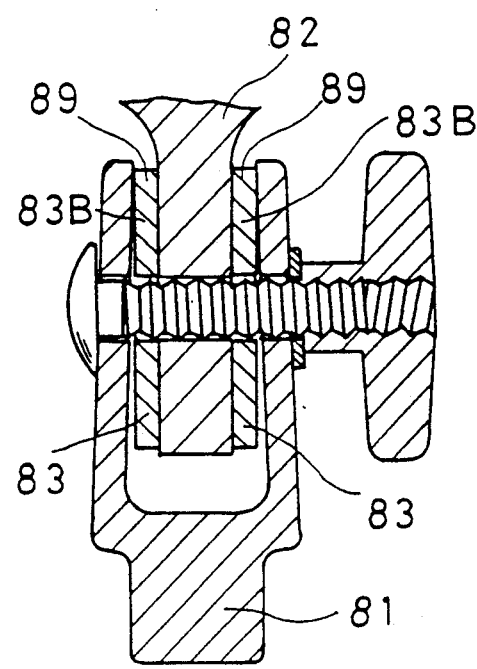
FIG. 10 is likewise a cross section of the same.

It is preferable to fix the claw parts 61 to the various stopping parts in slots in the first and second members with stopping screws 29, as shown in FIGS. 3 and 5, so that the friction plates 60A and 60B may not develop backlash inside the stopping part 18 of the first member 10 and the stopping part 28 of the second member 20.

The tightening force that is produced when the tightening bolt 50 and tightening nut 51 are tightened is converted into a force that compresses the friction plates 30 or 60 through the holding metal fitting. Accordingly, it becomes possible to press against the holding surface of the second member over the entire surface of the friction plate(s), which produces a large compressive and tightening force so as to accurately hold the installed items.

In addition, the tightening force may be made to withstand a greater load by changing the size and/or the number of the friction plates.

Because there is not a one sided or top side load on the friction plates, as occurs with the conventional structure described above, it is possible to prevent asymmetric wear of the friction plates and of the first and second members 10 and 20, improving their durability.

If necessary, angular adjustment can be set smoothly to a desired angle by shifting the movable side without operating the tightening nut, in view of the presence of the washer 19.

The invention offers a highly practical angle adjusting mechanism which is compact in outside appearance, superior in holding force, capable of smoother operation and extremely effective.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An angle adjusting mechanism for adjusting the angle between first and second members, comprising a first member having a first support wall, a first opening through the first support wall for passage therethrough of a tightening element; the first member having a second support wall, a second opening through the second support wall for passage therethrough of the tightening element; a tightening element between the first and second support walls for being tightened to draw the first and second support walls together thereby to securely hold objects between the first and second support walls;

a second member having a third holding wall disposed between the first and second support walls, the third wall having a thickness less than the distance between the first and second walls;

at least one friction plate disposed between the second and third walls and normally in frictional engagement with the third holding wall, wherein the friction plate comprises two friction plates which are between the second and third walls and are in surface frictional engagement with each other, one of the friction plates frictionally engaging a holding fitting and the other of the friction plates engaging the third holding wall of the second member;

means for preventing rotation of the friction plates;

a holding fitting disposed between the second support wall and one of the friction plates, and including holding fitting support means thereon that are supported to the second support wall for enabling the holding fitting to move with respect to the second support wall toward and away from the second support wall and for preventing movement of the holding fitting in a direction across the plane of the second support wall, the holding fitting having a compressive part that engages the friction plate such that upon tightening of the tightening element to draw the first and second walls toward each other, the compressive part of the holding fitting compressively tightens against one of the friction plates for substantially uniformly distributing the compression force over the friction plate.

2. The angle adjusting mechanism of claim 1, further comprising a third friction plate disposed between the third holding wall of the second member and the first support wall of the first member, whereby there is at least one respective friction plate at each of the opposite sides of the third holding wall.

3. The angle adjusting mechanism of claim 1, wherein the holding fitting is a rigid fitting.

4. The angle adjusting mechanism of claim 3, wherein the holding fitting is a metal fitting.

5. The angle adjusting mechanism of claim 1, wherein the tightening element comprises a bolt extending between the first support wall and the second support wall and comprises a nut at the second support wall for being tightened onto the bolt.

6. The angle adjusting mechanism of claim 5, wherein the holding fitting is supported on the bolt for being movable along the bolt and for being restrained by the bolt from moving across the plane of the second support wall.

7. The angle adjusting mechanism of claim 6, wherein the holding fitting includes a generally tubular part having a periphery, the tubular part extending from the holding fitting in the direction toward the second wall, and the second wall having an opening therethrough generally shaped to the periphery of the tubular part for receiving the tubular part therein and for guiding the tubular part to move with respect to the second wall while preventing movement of the tubular part in the direction across the plane of the second support wall.

8. The angle adjusting mechanism of claim 7, wherein the tubular part has an opening through it through which the bolt extends, and the nut being on the bolt beyond the tubular part of the holding fitting.

9. The angle adjusting mechanism of claim 8, further comprising a pressure applying washer on the bolt between the nut and the tubular part, and the washer being sufficiently yieldable to permit relative angular adjustment between the first and second support walls without loosening of the bolt and nut.

10. The angle adjusting mechanism of claim 1, further comprising means for preventing rotation of the holding fitting during the relative rotation of the first and second members during angle adjustment.

11. The angle adjusting mechanism of claim 1, wherein the holding fitting rotation prevention means is on the holding fitting.

12. The angle adjusting mechanism of claim 1, wherein the friction plate rotation prevention means is provided on the friction plate.

13. The angle adjusting mechanism of claim 12, further comprising a first rotation preventing connection from one of the friction plates to the first member and a second rotation preventing connection from the other of the friction plates to the second member, thereby preventing the rotation of the friction plates with respect to the first and second members.

14. The angle adjusting mechanism of claim 13, further comprising two more of the friction plates between the first support wall and the third holding wall and in surface frictional engagement with each other and with the first and the third walls.

15. The angle adjusting mechanism of claim 1, wherein the holding fitting includes a generally tubular part having a periphery and extending from the holding fitting in the direction toward the second wall, and the second wall having an opening therethrough generally shaped to the periphery of the tubular part for receiving the tubular part therein, and for guiding the tubular part to move with respect to the second wall while preventing movement of the tubular part in the direction across the plane of the second support wall;

the tubular part and the opening through the second support wall being respectively splined for providing a splined connection therebetween permitting the holding fitting to move toward and away from the second support wall while preventing rotation of the holding fitting relative to the second wall.

16. The angle adjusting mechanism of claim 1, wherein the holding fitting includes a part extending from the holding fitting in the direction toward the second wall, and the second wall having an opening therethrough generally shaped to the periphery of the part for receiving the part therein, and for guiding the part to move with respect to the second wall while preventing movement of the part in the direction across the plane of the second support wall.

17. The angle adjusting mechanism of claim 1, further comprising means for connecting the first member to a post which supports the angle adjusting mechanism;

support means on the second member for supporting a standard, and the angle adjusting mechanism permitting rotation of the first and second members for adjusting the angle therebetween, thereby adjusting the angle of the supported standard with respect to the post.

* * * * *